May 7, 1946. W. T. SCHREIBER 2,399,696
COMBINATION SUNLIGHT OR ARTIFICIAL HEAT DEHYDRATOR AND HOTBED
Filed Oct. 13, 1943
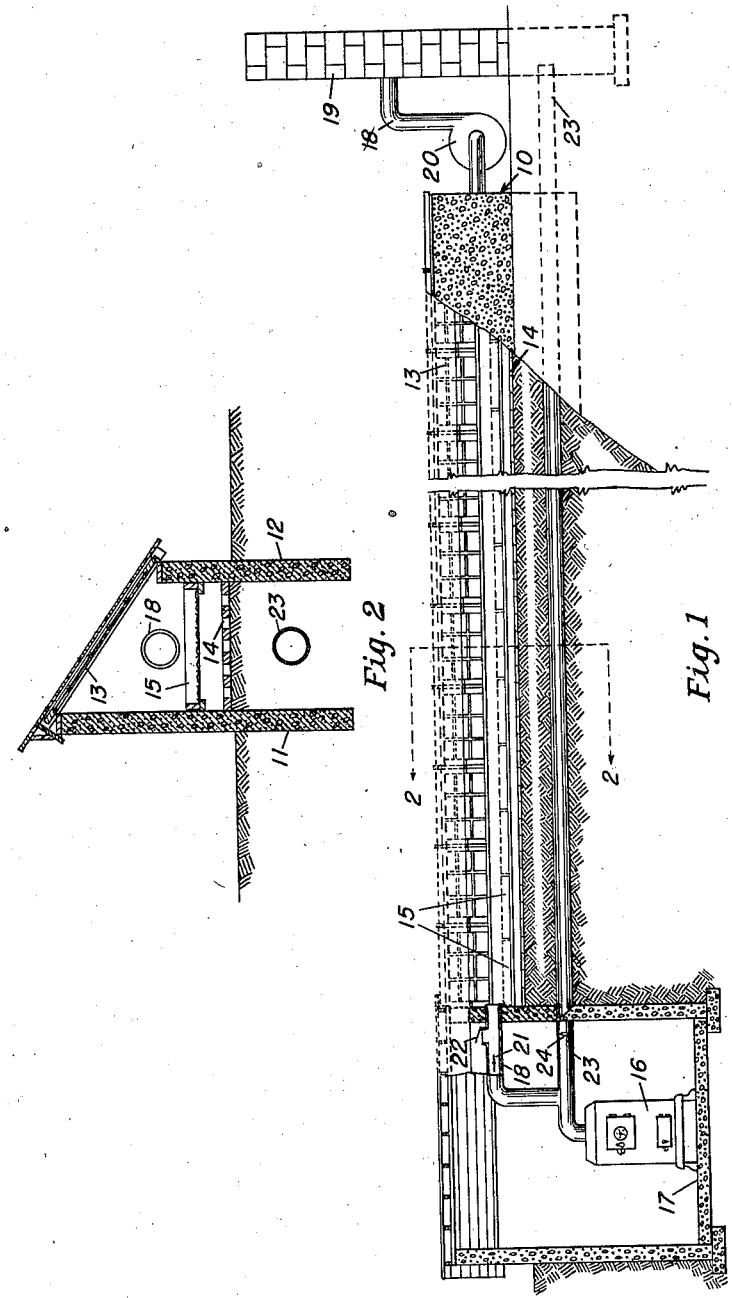
WALTER T. SCHREIBER Inventor Patented May 7, 1946

2,399,696

UNITED STATES PATENT OFFICE 2,399,696

COMBINATION SUNLIGHT OR ARTIFICIAL HEAT DEHYDRATOR AND HOTBED

Walter T. Schreiber, Auburn, Ala., assignor to the United States of America, as represented by the Secretary of Agriculture Application October 13, 1943, Serial No. 506,032

1 Claim. (Cl. 47—19)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to dehydration of food products, such as shredded sweet potatoes, and to a hot-bed, and has among its objects the provision of a structure which can be used to dehydrate products either by sunlight or artificial heat, or used as a hot-bed, and such other objects as will be apparent from the following description and claims.

Referring to the accompanying drawing,

Figure 1 is a partial sectional plan view of the structure; and

Figure 2 is a section on the line 2—2 of Figure 1.

A rectangular box-like structure 10 formed from any suitable material is provided with side walls 11 and 12 set in the ground, and is covered with a removable clear glass frame 13 in the manner of a conventional type hot-bed. For purposes of dehydration, the soil-planting bed inside the box-like structure may be provided with a removable covering 14, such as loosely laid brick. Trays 15 on which products to be dehydrated are placed are suitably supported above the soil bed under the glass frame 13. A conventional fuel-burning heater or stove 16 is located in a pit 17 provided at one end of the box-like structure. Flue gases from the heater pass through a pipe 18 directly into the space containing the trays, and are circulated around the trays, out of the other end of the box-like structure, and into a chimney 19, by a conventional type power fan 20.

On warm sunny days products can be dehydrated by reliance on sunlight, the fan 20 acting merely to circulate and withdraw the air around and from the products. In case of cloudy weather, dehydration is accomplished by building a fire in the heater to furnish hot flue gases, regulation of the temperature being obtained by adjusting the fan speed and setting of the stove drafts, flue damper 21 and check damper 22. In case it is desired to use the structure as a hot-bed, trays 15 and covering 14 are removed for planting in the soil bed within the box-like structure. As a means for supplying artificial heat, a branch pipe 23 provided with a damper 24 runs under the ground between walls 11 and 12, and is connected to the heater and chimney. By closing damper 21 and opening damper 24, the hot flue gases are directed through pipe 23. If, due to the length of pipe 23, there is insufficient draft, pipe 23 may be coupled through fan 20 or forced draft can be supplied by any other suitable means.

The structure shown is of simple construction, and is economical to operate, it being necessary to supply artificial heat only when the sunlight is insufficient. Its adaptability both for dehydration and use as a hot-bed makes it particularly useful, since the spring season of its use as a hot-bed does not correspond with the season of its use as a dehydrator.

Having thus described the invention, what is claimed is:

A hot-bed provided with a soil-planting bed and a glass frame for admittance of sunlight, means for supporting products to be dehydrated above the planting bed within the hot-bed, a heater, a pipe connecting the heater and hot-bed for passing hot gases from the heater into the hot-bed, a fan connected to the hot-bed for circulating the gases therethrough, a branch pipe connected to the heater and running under the ground for passage of hot gases to heat the soil within the hot-bed, and means for regulating the gas flows to direct gas either through the hot-bed or through the branch pipe.

WALTER T. SCHREIBER.